United States Patent [19]
Jewell et al.

[11] Patent Number: 4,756,606
[45] Date of Patent: Jul. 12, 1988

[54] APPARATUS COMPRISING A MONOLITHIC NONLINEAR FABRY-PEROT ETALON, AND METHOD FOR PRODUCING SAME

[75] Inventors: Jack L. Jewell, Bridgewater; Samuel L. McCall, Jr., Chatham, both of N.J.

[73] Assignee: American Telephone and Telegraph Company, AT&T Bell Laboratories, Murray Hill, N.J.

[21] Appl. No.: 870,842

[22] Filed: Jun. 5, 1986

[51] Int. Cl.$^4$ .......................... G02B 5/23; G02B 5/30; H01S 3/10
[52] U.S. Cl. ................................ 350/354; 350/385; 350/386; 350/393; 372/21
[58] Field of Search ............... 350/354, 385, 386, 393; 372/21, 43; 332/7.51; 330/4.3

[56] References Cited

U.S. PATENT DOCUMENTS

| | | | |
|---|---|---|---|
| 3,517,983 | 6/1970 | Fein et al. | 350/354 |
| 3,787,234 | 1/1974 | Smiley et al. | 372/43 |
| 4,012,699 | 3/1977 | Gibbs et al. | 330/4.3 |
| 4,081,763 | 3/1978 | Vlasenko et al. | 372/43 |
| 4,573,767 | 3/1986 | Jewell | 350/354 |

OTHER PUBLICATIONS

Miller et al., "Large Room-Temperature Optical Nonlinearity in GaAs/Ga$_{1-x}$As Multiple Quantum Well Structures," App. Phys. Lett., vol. 41, No. 8, Oct. 15, 1982, pp. 679-681.
Electro-Optical Systems Design, "All-Optical GaAs Chip: Bistable at Room Temperature," May 1982, p. 12.
"Spectral Characteristics of Nonlinear Interferometers in a Strong Field," *Zhurnal Prikladnoi Spektroskopii*, F. V. Karpushko et al., Feb. 1977, pp. 204-209.
"Switching of a Laser Emission Spectrum by an External Optical Signal," *Sov. J. Quantum Electron*, F. V. Karpushko et al., Apr. 1979, pp. 520-521.
"The Anomalous Nonlinearity and Optical Bistability in Thin-Film Interference Structures," *Applied Physics B*, F. V. Karpushko et al., Feb./Mar., p. 137.

*Optical Bistability: Controlling Light with Light*, Academic Press, Inc., Hyatt M. Gibbs, 1985, pp. 121-123.
"Fabrication of GaAs Bistable Optical Devices," *Materials Letters*, J. L. Jewell et al., 1983, pp. 148-151.
"Optical Bistability," *Optics News*, H. M. Gibbs et al., 1979, pp. 6-12.
"Architectural Considerations Involved in the Design of an Optical Digital Computer," *Proc. of the IEEE*, A. Huang, 1984, pp. 780-786.
"Digital Optical Computing," *Proc. of the IEEE*, A. A. Sawchuk et al., 1984, pp. 758-779.
"3-pJ, 82-MHz Optical Logic Gates in a Room-Temperature GaAs-AlGaAs Multiple-Quantum-Well Etalon," *Appl. Phys. Lett.*, J. L. Jewell et al., 1985, pp. 918-920.

(List continued on next page.)

*Primary Examiner*—Gene Wan
*Assistant Examiner*—Michael B. Shingleton
*Attorney, Agent, or Firm*—Eugen E. Pacher

[57] ABSTRACT

The inventive method for forming monolithic nonlinear Fabry-Perot etalons comprises depositing on an appropriate substrate, e.g., a GaAs wafer, a first multilayer mirror, depositing on the first mirror a spacer typically comprising optically nonlinear material, and depositing a second multilayer mirror onto the spacer. Typically, at least one of the mirrors is an active mirror comprising optically nonlinear material. Deposition can be by a known process, e.g., by MBE or MOCVD. Since, inter alia, the method comprises no critical etching steps it can be used to produce high finesse etalons that have uniform properties over relatively large areas. The inventive method can be adapted to the manufacture of transmissive etalons. It can also be used to produce arrays of optically isolated etalons. Devices comprising nonlinear etalons manufactured by the inventive method can be incorporated, for instance, into optical data processing apparatus, or into optical communications apparatus.

26 Claims, 5 Drawing Sheets

OTHER PUBLICATIONS

"High Reflectivity GaAs–AlGaAs Mirrors Fabricated by Metalorganic Chemical Vapor Deposition," *Appl. Phys. Lett.*, R. L. Thornton et al., 1984, pp. 1028–1057.

"Interference Filters: Single Crystal Multilayer AlAs–GaAs," *Applied Optics*, J. P. van der Ziel et al., 1976, pp. 1256–1257.

"Multilayer GaAs–$Al_{0.3}Ga_{0.7}As$ Dielectric Quarter Wave Stacks Grown by Molecular Beam Epitaxy," *Applied Optics*, J. P. van der Ziel et al., 1975, pp. 2627–2630.

"An Optical Logic Element for Integrated Optics in a Nonlinear Semiconductor Interferometer," F. V. Karpushko et al., Plenum Publishing Corp., 1979.

"Starlite: A Wideband Digital Switch," *Proc. of the IEEE Global Telecommunications Conference*, A. Huang et al., 1984, pp. 121–125.

APPARATUS COMPRISING A MONOLITHIC NONLINEAR FABRY-PEROT ETALON, AND METHOD FOR PRODUCING SAME

FIELD OF THE INVENTION

This invention pertains to the field of nonlinear optical devices, and to apparatus incorporating such devices.

BACKGROUND OF THE INVENTION

Bistable and other nonlinear optical devices have been known for some time, and a wide variety of signal processing functions can be carried out by means of bistable devices. "Bistable" and "nonlinear" are used herein interchangeably unless indicated otherwise by the context. For instance, U.S. Pat. No. 4,012,699 discloses, inter alia, amplification of a light beam by means of a cavity-enclosed positive-temperature nonlinear medium. A recent monograph, H. M. Gibbs, *Optical Bistability: Controlling Light With Light*, Academic Press (1985) can serve as an introduction to the field and discusses many of the possible modes of operation of bistable optical devices. For instance, on pages 1–17, incorporated herein by reference, are given brief discussions of bistable optical logic devices (both two-state and many-state), of an optical transistor, of optical discriminators, limiters, pulse compressors, oscillators, gates, and flip-flops. And pages 195–239, also incorporated herein by reference, contain a detailed discussion of optical switching.

Many of the nonlinear optical devices comprise a nonlinear Fabry-Perot (FP) etalon, a fixed-spacing optical cavity with an optically nonlinear medium within the cavity. Furthermore, much of the work on optically nonlinear devices has focused on devices using solid, typically semiconductor, mostly GaAs-based, nonlinear media. Such media are, for instance, homogeneous GaAs, and GaAs-AlGaAs multiple quantum well (MQW) structures.

As described for instance by J. L. Jewell et al, *Materials Letters*, Vol. 1(5–6), pp. 148–151 (1983), GaAs-based nonlinear FP etalons are fabricated by a rather difficult process. The process exemplarily involves deposition of an about 3 $\mu$m GaAs-AlGaAs MQW structure on a GaAs substrate by molecular beam epitaxy, and removal of the substrate by grinding and selective etching so as to leave the MQW structure. The resulting 3 $\mu$m flake can then be mounted between dielectric mirrors, thereby producing a nonlinear FP etalon.

FIGS. 1 and 2 schematically show another prior art FP etalon formed by etching away a portion of a GaAs substrate. See, H. M. Gibbs et al., *Optics News*, Vol. 5(3), pp. 6–12 (1979), incorporated herein by reference. The etalon 12 was produced by depositing a 0.2 $\mu$m $Al_{0.42}Ga_{0.58}As$ etch stop layer 15 onto the 150 $\mu$m GaAs substrate 10, followed by deposition of the 4.1 $\mu$m GaAs active spacer layer 14 and of a further AlGaAs layer 15. After grinding and etching away of the GaAs substrate in a 1 mm² region 11 of FIG. 1, a (non-active) multilayer mirror 16 was formed by vapor deposition on each layer 15.

Karpushko et al. (*Journal of Applied Spectroscopy USSR*, Vol. 29, p. 1323 (1978)) disclosed an optical interference filter comprising two mirrors with a ZnS spacer therebetween, that exhibited optical bistability.

Prior art nonlinear etalons as described above have significant shortcomings. Among these is the difficulty of controlling the etching of the substrate sufficiently well to achieve the high thickness uniformity required for high-finesse mirrors. As is well known, if F is the desired finesse associated with the etalon, then the thickness of the spacer layer/etch stop layer combination has to be uniform to at least $\lambda_o/2nF$ over a significant portion of the flake, where $\lambda_o$ is the vacuum wavelength of the operating radiation of the device, and n is the refractive index of the material. For instance, if a finesse of 10 is desired, the spacer thickness has to be constant to within about 11 nm for $\lambda_o$ of about 0.87 $\mu$m. In etalons of the type described by Jewell et al. (op cit), it is also difficult to achieve good and stable mechanical and thermal contact between the flake and the mirrors. Furthermore, the prior art methods for producing nonlinear FP etalons tend to require substantial skill and manual dexterity, and do not lend themselves to the formation of multi-etalon arrays.

Due to the promise held by nonlinear FP etalons, for instance, in the field of optical data processing, including optical computing, and in optical communications, it would be highly desirable to have available a method for producing such etalosn that is not subject to these and other shortcomings of the prior art. This application discloses such a technique. For information on optical computing, see *Proceedings of the IEEE*, Vol. 72(7) 1984, especially A. A. Sawchuck et al (pp. 758–779), and A. Huang (pp. 780–786). A. Huange et al., *Proceedings of the IEEE Global Telecommunications Conference*, Atlanta, Ga., 1984, pp. 121–125 discloses telecommunications apparatus that can be implemented using nonlinear optical devices according to the invention.

DEFINITIONS AND GLOSSARY OF TERMS

A material is herein said to be "optically nonlinear" at a given frequency $\nu_o$ if, over a spectral region that includes $\nu_o$, one or more parameters of the material, at substantially constant temperature of the material, are dependent on the intensity of the radiation incident of frequency $\nu_o$ on the material. Among the parameters are the refractive index n and the absorptivity $\alpha$. This definition is intended to exclude changes in material parameters that are due to heating caused by the incident radiation. Nonlinear materials, to be of interest in this application, typically have a nonlinearity grater than one-tenth that of GaAs and have material relaxation times shorter than $10^{-8}$ sec.

A device herein is "optically nonlinear" if, for some range of input intensity, at least one of the relevant parameters of the device (e.g., transmissivity, reflectivity, or absorptivity) changes with intensity. Nonlinear devices contain at least one optically nonlinear material, also referred to as an "active" material. A nonlinear device is said to be refractive or absorptive, depending on whether the predominant nonlinearity of the active material in the device is in n or in $\alpha$, respectively. It is, of course, also possible that n and $\alpha$ contribute approximately equally to the nonlinearity.

Associated with nonlinear optical devices are at least two "optical states", namely, a first state in which one of the relevant parameters of the device has a first value, and a second state in which the relevant parameter has a second value different from the first value. Exemplarily, the first state may be a state of low transmissivity, and the second state a state of high transmissivity.

SUMMARY OF THE INVENTION

We have discovered a method for fabricating a monolithic nonlinear FP etalon, (i.e., a nonlinear etalon both of whose mirrors are integral with the spacer, without bonding layers and the like) that does not require etching away a portion or all of the substrate material prior to formation of one or both of the mirrors. The inventive method thus is free of the problems due to nonuniform etching that plague the prior art. Other advantages of the invention will become apparent.

The inventive method comprises providing an appropriate substrate (e.g., GaAs, or some other semiconductor) having a planar major surface, and depositing thereon in succession a first multilayer mirror, a spacer layer, and a second multilayer mirror. Deposition of the layers can be by any appropriate process, e.g., molecular beam epitaxy (MBE) or metalorganic chemical vapor deposition (MOCVD).

The basic method can be elaborated in various ways. For instance, if it is desired to produce an etalon that can be operated in a transmissive mode, then a compound substrate can be provided, namely, a substrate comprising an appropriate support structure (e.g., a GaAs wafer) with, e.g., a transparent (at frequency $\nu_o$) etch stop layer thereon. The transparent layer not only protects the first mirror during subsequent removal of all or a portion of the support structure underneath one or more etalons, but also serves to give mechanical support to the etalon(s). Of course, if a suitable substrate that is transparent at $\nu_o$ is available, then a transmission device can be produced even without deposition of a transparent layer and etching away of the support structure.

A further exemplary embodiment of the inventive method comprises depositing an $Al_xGa_{1-x}As$ (x>0.5, e.g., 0.7) etch stop layer onto a GaAs wafer, and depositing an etalon according to the invention thereon. After completion of the depositions all of the GaAs wafer is removed by known means, followed by complete removal of the etch stop layer, e.g. by etching in concentrated HCl. The thus produced "flake" (constituting one or more complete etalons) can be mounted on or between appropriate support means, e.g., between two quartz plates.

The inventive method can routinely produce nonlinear etalons having high finesse (typically > 10, 20, or even 25), and substantially uniform response over a relatively large area (e.g., >1 mm$^2$), due to the ease with which high thickness unformity of the spacer (as well as of the various mirror layers) and low optical loss interfaces can be achieved. The method if free of any critical etch step, i.e., of any etch step that affects a material layer whose thickness and/or thickness uniformity is critical to the optical quality of the etalon. Furthermore, the inventive method results in relatively rugged, mechanically and thermally stable etalons whose manufacture does not require great manual dexterity; the method lends itself to automation, and can be used to produce multi "pixel" arrays by addition of known lithography and etching (for ion implantation) steps to the inventive process. Lastly, the inventive method is compatible with techniques used in the manufacture of electronic and opto-electronic devices. Thus, it is expected that it will be possible to integrate nonlinear optical devices according to the invention with electronic, optoelectronic, or perhaps other optical devices on the same semiconductor chip.

In preferred embodiments, at least one of the two multilayer mirrors of the nonlinear etalon is an "active" mirror. An active mirror is a multilayer mirror in which at least one of the materials forming the mirror shows appropriate optical nonlinearity at $\nu_o$, the operating frequency of the device (thereby imparting nonlinearity to the mirror), such that the mirror nonlinearity contributes to the nonlinear behavior of the device. Exemplarily, an active mirror consists of a multiplicity of AlAs and GaAs layers.

Devices according to the invention may comprise two or more optical cavities in series, one or more optically linear and/or nonlinear spacers, a transparent or opaque (at $\nu_o$) support structure, etch stop layers, lattice matching layers, reflection or antireflection layers, coating layers, and the like. Although typically the optically active materials in etalons according to the invention are crystalline, this is not necessarily so.

Apparatus according to the invention typically comprises a source of electromagnetic radiation of frequency $\nu_o$, at least one nonlinear FP etalon according to the invention, means for causing the $\nu_o$ radiation to interact with the etalon, whereby the optical state of the etalon can be changed from a first to a second state, and means that are responsive to the optical state of the etalon. Exemplarily, such apparatus is an optical computer or other optical data processing apparatus, or is an optical communications apparatus.

DETAILED DESCRIPTION OF SOME PREFERRED EMBODIMENTS

Figure 1:
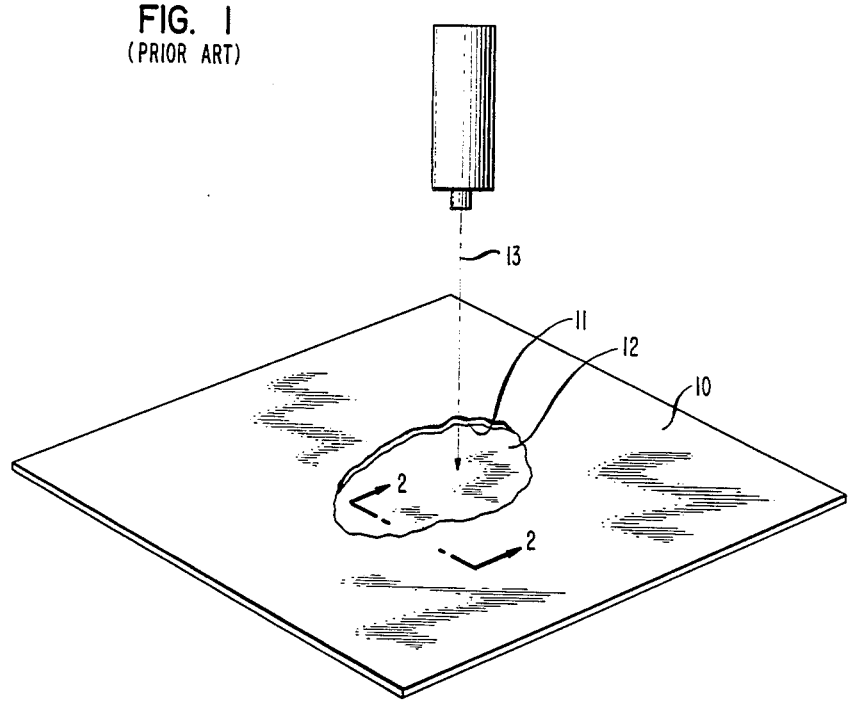
FIGS. 1 and 2 schematically depict a prior art nonlinear FP etalon.
Figure 2:
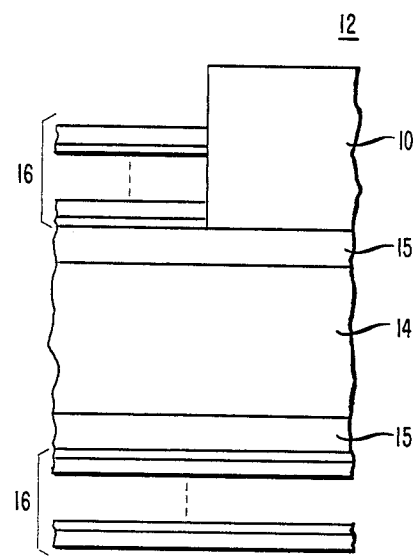
Figure 3:
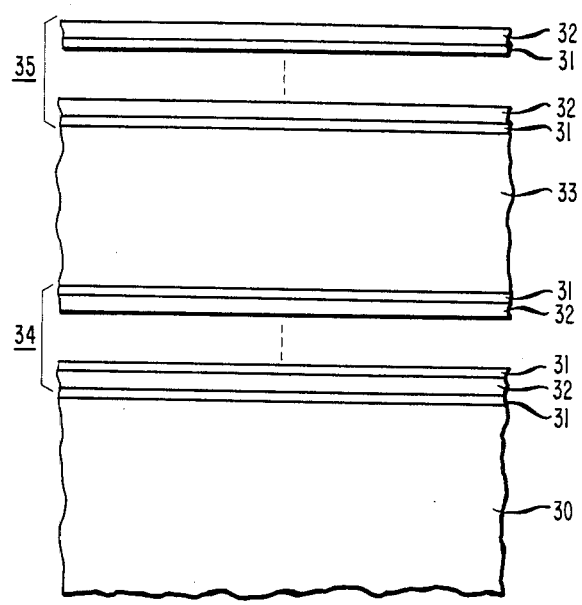
FIG. 3 shows schematically a portion of a nonlinear FP etalon according to the invention.

FIG. 3 shows schematically, in cross-section, a portion of an exemplary monolithic FP etalon according to the invention. It comprises a substrate 30, a first mirror 34, a spacer 33, and a second mirror 35. The substrate typically is an appropriate semiconductor wafer and the first mirror comprises alternating layers 31 and 32 of two materials of differing refractive index at $\nu_o$.

The thickness of each type of layer depends, inter alia, on the refractive index of the layer material and on $\nu_o$. Typically, the thickness of a layer is chosen to be $\nu_o/4n$. The optical properties of periodically stratified media of the type discussed herein are well known. See, for instance, M. Born and E. Wolf, *Principles of Optics*, 2nd edition (1964), pp. 66–70, incorporated herein by reference. Although generally it is advantageous to deposit layers of constant thickness, it may at times be advantageous to deposit tapered mirror layers, to provide frequency tunability, or for other reasons.

The spacer 33 typically is approximately of thickness $\nu_o/2n$ (or a multiple thereof), and is of essentially uniform thickness. It generally, but not necessarily, consists of material that is optically active at $\nu_o$. The second mirror resembles the first mirror but need not comprise the same combination of materials and/or contain the same number of layers. One or both of the multilayer mirrors may (but need not) comprise optically active material (at $\nu_o$), as will be discussed in more detail below.

Figure 7:
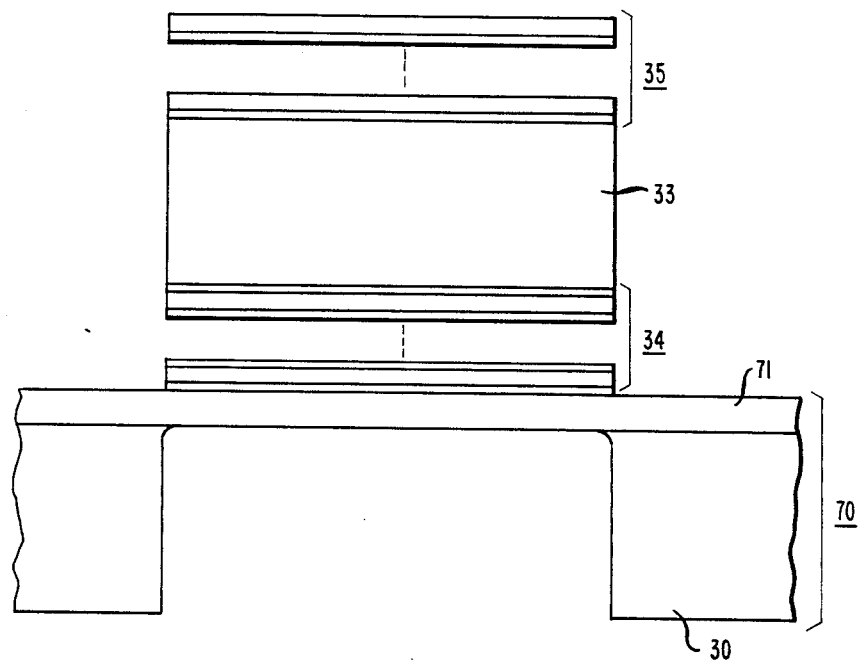
FIG. 7 schematically depicts a portion of a device according to the invention comprising a nonlinear FP etalon, grown on an opaque substrate, that is adapted for operation in a transmissive mode.

Whereas FIG. 3 depicts an inventive etalon that is most usefully employed in a reflective mode (unless substrate 30 is transparent at $\nu_o$), FIG. 7 shows schematically, in cross-section, an exemplary inventive etalon that can be used in a transmissive, as well as in a reflective mode. It differs from the previously discussed etalon in comprising a compound substrate 70 that comprises a layer 30 (e.g., GaAs of appropriate thickness) and a transparent (at $\nu_o$) layer 71 thereon (e.g., 1-10 $\mu$m of $Al_{0.42}Ga_{0.58}As$). As indicated in FIG. 7, a portion of 30 is removed, typically after completion of the deposition of the etalon atop the compound substrate. Such removal can be by known means, typically comprising lithography and etching (dry or wet), ion milling or the like.

The inventive method for fabricating monolithic nonlinear FP etalons comprises providing an appropriate substrate having a planar major surface, and depositing thereon, by any appropriate technique, or combination of techniques, the first mirror, the spacer, and the second mirror, as well as possibly other layers.

Figure 9:
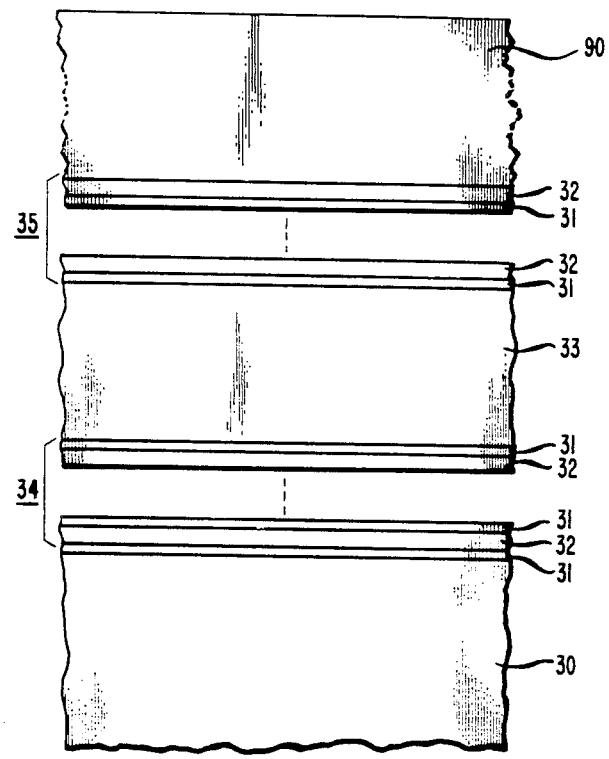
FIG. 9 schematically depicts a portion of a further non-linear FP etalon according to the invention.

This is schematically depicted in FIG. 9, wherein layer 90 is a further layer of spacer material deposited onto the etalon, and the (optional) presence of other layers on layer 90 is indicated by means of a dotted line.

Advantageously, the sequence of depositions is carried out without intermittent handling of the wafer, e.g., in an MBE chamber with multiple sources.

Following completion of the etalon deposition further manufacturing steps may be carried out. Exemplarily, these steps may include deposition of a protective coating onto the top mirror, or coating of the top (and/or bottom) surface of the thus produced combination with an appropriate resist, such that the top (and/or bottom) surface of the combination can then be patterned by methods well known in the semiconductor industry. By means of such patterning, an array of FP etalons can be produced. Such an array can easily contain 100×100 etalons, and may be as large as 1000×1000. It is considered to be one of the main advantages of the inventive method that it permits relatively easy formation of such arrays.

Figure 4:
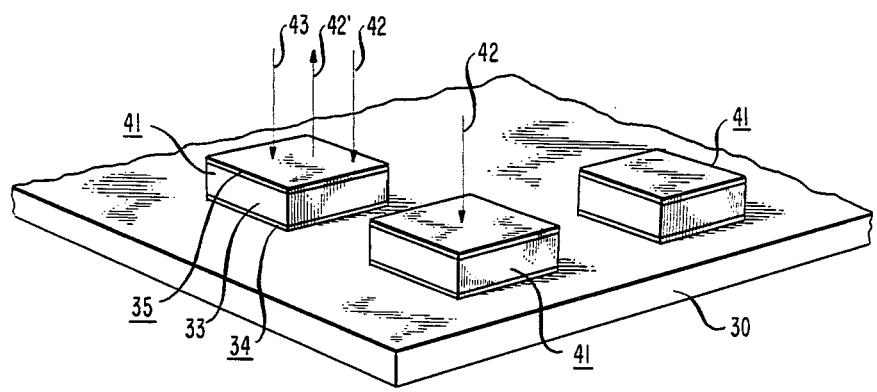
FIGS. 4 and 5 each schematically show a portion of an exemplary device comprising an array of nonlinear FP etalons according to the invention.

FIG. 4 schematically depicts a portion of a device 40 according to the invention comprising an array of reflective OR logic elements. On the common substrate 30 are formed a multiplicity of individual, optically isolated mesa-like elements 41 of the type depicted in FIG. 3. By "optically isolated", we means herein that a change in the optical state of any one of the elements does not have a substantial effect on the optical state of any of the other elements of the array.

Exemplarily, the elements 41 can be operated as follows: A probe beam 42 (of frequency $\nu_p$, with $\nu_p$ selected such that the nonlinearity of the etalons is relatively small at $\nu_p$), can be directed onto one or more of the elements, resulting in substantially no reflected probe radiation 42'. When both an "input" beam 43 (of frequency $\nu_o$, with $\nu_o$ selected such that the nonlinearity of the etalons is relatively large at $\nu_o$) and the probe beam 42 are directed onto an etalon, the optical state of the etalon can change such that a substantial amount of probe radiation 42' is present For instance, if the etalon contains a GaAs spacer, then $\nu_o$ and $\nu_p$ exemplarily correspond to wavelengths of 868 and 873 nm, respectively. If other nonlinear materials (e.g., InSb, InGaAsP and related compounds) are used, then the appropriate frequencies typically will be different.

The presence of 42' can be detected by known means (e.g., a filter and a photodetector), thereby providing a read-out indicative of the optical state of the element. If two or more input beams 43 can be directed onto an element, each of which can cause the described change in the optical state of the element, then the element functions as a logical OR gate. Other logic functions can, of course, also be implemented.

Figure 5:
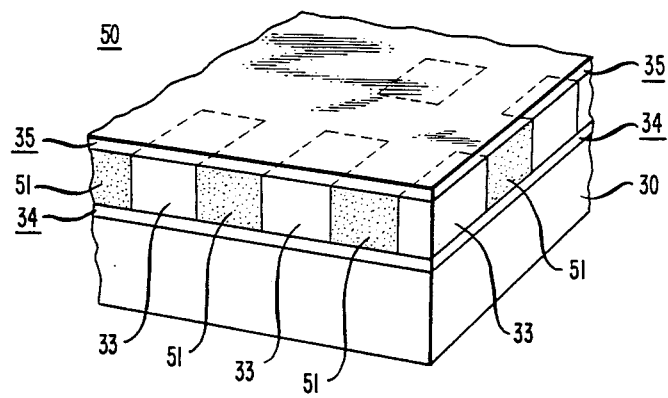

FIG. 5 schematically shows another exemplary array of FP etalons according to the invention. In this embodiment, the optical isolation between etalons 33 is achieved not be removal of material as shown in FIG. 4, but by changing the optical properties of the material in regions 51. For instance, the nonlinear properties in regions 51 can be changed by ion implantation (e.g., by proton implantation), such that adjacent etalons are effectively decoupled.

Figure 6:
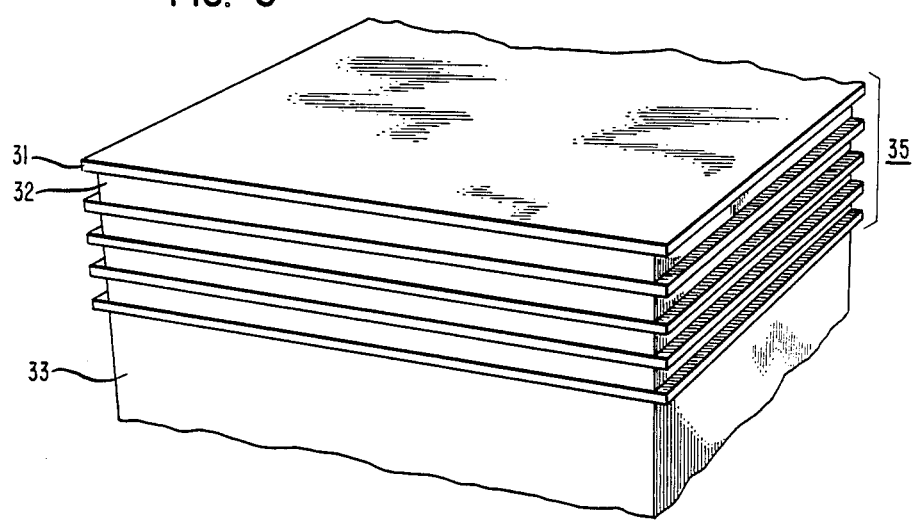
FIG. 6 schematically depicts a portion of a monolithic nonlinear FP etalon with mirror sidewalls that comprise a "grating"

FIG. 6 schematically depicts a portion of an exemplary etalon according to the invention. Etalon 41 has one or more side surfaces that intersect the layers of the second mirror, the intersected mirror layers forming a "grating", i.e., a periodic variation in the surface topography of the intersecting surface. Such a grating can easily be produced, e.g., by contacting the side surfaces with an etching medium in which the etch rates of the two mirror materials are different. The presence of an appropriately formed grating may increase the operational efficiency of etalons according to the invention. However, the effect of a grating on the operation of an etalon can be expected to depend on the details of the situation. Thus, minor experimentation may be required, for instance, to determine which of the two layer materials should be etched more rapidly. Although FIG. 6 shows a second mirror only, it will be understood that the first mirror can be similarly treated.

Figure 8:
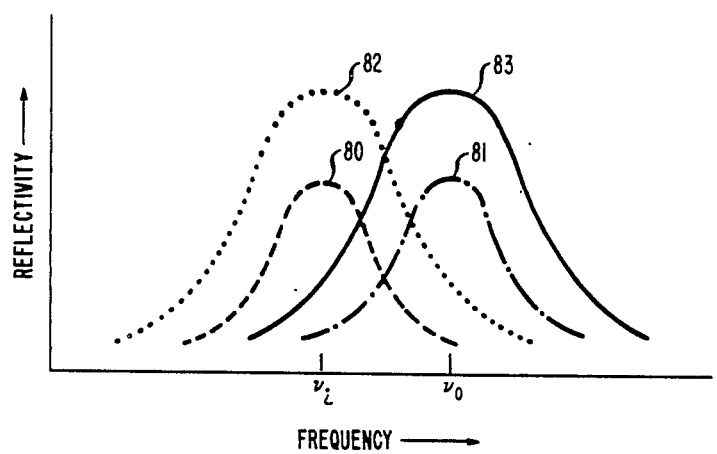
FIG. 8 schematically illustrates material properties useful in the design of active mirror.

FIG. 8 illustrates some material properties that can advantageously be used in the design and manufacture of active mirrors according to the invention. The figure schematically depicts curves of mirror reflectivity as a function of wavelength. Curve 80 represents the reflectivity of an active mirror measured at such low incident intensity that the effect of nonlinearity is negligible. As can be seen, the reflectivity is maximum at a frequency $\nu_i \neq \nu_o$. If the nonlinearity of the mirror is essentially dispersive, and if the reflectivity is measured with incident radiation of intensity greater than some threshold intensity $I_t$ (to be defined below), then curve 81, with maximum at some frequency $\nu_o$, results. On the other hand, if the mirror nonlinearity is essentially absorptive, then, for intensity $> I_t$, curve 82 (with maximum reflectivity greater than that of 80 and substantially at $\nu_i$) results. Lastly, if the mirror nonlinearity is both dispersive and absorptive, curve 83, with maximum reflectivity greater than 80 (or 81) and at some frequency $\neq \nu_i$ (e.g., at $\nu_o$) results. Thus, the reflectivity of an active mirror at a given frequency can vary substantially as a function of intensity. In the high intensity state, it can be either larger (as at $\nu_o$ of FIG. 8) or smaller (as at $\nu_i$) than in the low intensity state. Both of these possibilities are considered to be potentially useful.

Preferred inventive nonlinear FP etalons with active mirrors thus can be designed such that in a first optical state, the reflectivity of at least one of the mirrors of the etalon has a maximum at $\nu_i \neq \nu_o$, and that in a second optical state, the mirror has maximum reflectivity at $\nu_o$. The threshold intensity $I_t$ is an intensity of radiation of frequency $\nu_o$ that is associated with the change of the state of the etalon from the first to the second optical state.

EXAMPLE I

A 500 μm thick, (100) cut, 2-inch diameter GaAs wafer was, after cleaning by a known technique, mounted in the specimen holder of a multi-source MBE system, and a relatively thin (~1 μm) GaAs smoothing layer deposited thereon. Onto the thus prepared (100) surface of the substrate wafer were deposited 9½ pairs of AlAs/GaAs layers, of thickness 72.3 nm and 63.5 nm respectively. Deposition of the last AlAs layer was followed by deposition of a nonlinear spacer, namely, an essentially uniform thickness (~2 μm) layer of GaAs. This, in turn, was followed by deposition of 7 pairs of AlAs/GaAs layers, also of 72.3 and 63.5 nm thickness, respectively, with the last layer being GaAs. The thus manufactured nonlinear etalon had a measured finesse of about 15 for radiation of (vacuum) wavelength 880 nm.

EXAMPLE II

A first active mirror, a spacer layer, and a second active mirror are deposited substantially as described in Example I. A patterned resist layer is formed atop the second mirror, the resist layer containing a 100×100 array of 2 μm×2 μm resist patches on 4 μm centers. The wafer is dry etched by a known process, resulting in removal of essentially all of the deposited material not protected by resist, thereby producing a 100×100 array of optically isolated nonlinear FP etalons adapted for operation at $\nu_o = 873$ nm as reflective NOR gates, with the probe beam wavelength being about 880 nm.

EXAMPLE III

An array of nonlinear FP etalons adapted for operation at 873 nm in a transmissive, or reflective and transmissive, mode is manufactured substantially as described in Example II, except that, prior to deposition of the first mirror, an Al$_{0.42}$Ga$_{0.58}$As layer of appropriate thickness (~2 μm) is deposited onto the GaAs wafer, etching of the deposited material is stopped at the Al-GaAs layer, and the GaAs wafer is etched to the Al-GaAs layer in the region opposite the etalon array.

What is claimed is:

1. Method of manufacturing an apparatus comprising at least one nonlinear Fabry-Perot etalon comprising a first and a second mirror and a spacer between the first and second mirrors,
   the method comprising providing a substrate having a planar major surface, and depositing material onto the major surface, at least some of the deposited material being optically nonlinear at an operating frequency $\nu_o$;
   characterized in that the method comprises
   (a) depositing the first mirror onto the major surface, the first mirror comprising alternating layers of at least two materials that differ in their refractive index at $\nu_o$;
   (b) depositing a layer of spacer material onto the first mirror; and
   (c) depositing the second mirror onto the layer of spacer material, the second mirror also comprising alternating layers of at least two materials that differ in their refractive index at $\nu_o$; and wherein
   (d) at least one of the first and second mirrors is an active mirror comprising semiconductor material this is optically nonlinear at $\nu_o$.

2. Method of claim 1, wherein the substrate is a compound substrate comprising a support structure, consisting of a first material and having a planar major surface, and at least one layer of material on the major surface of the support structure.

3. Method of claim 1 wherein the substrate comprises semiconductor material, and wherein the spacer material comprises semiconductor material that is optically nonlinear at $\nu_o$.

4. Method of claim 1, wherein the active mirror has a reflectivity that has a maximum at a frequency $\nu_i \neq \nu_o$ when the intensity of electromagnetic radiation of frequency $\nu_o$ impinging on the active mirror is below a threshold value $I_t$, and has a maximum at $\nu_o$ when the intensity of impinging electromagnetic radiation of frequency $\nu_o$ is greater than $I_t$.

5. Method of claim 1 wherein the optically active semiconductor material of the active mirror has both dispersive an absorptive nonlinearity.

6. Method of claim 1, further comprising removing some of the deposited material such that at least one mesa-like element is formed, the element having at least one side surface that intersects at least one of the first and second mirrors.

7. Method of claim 6, further comprising contacting the side surface with a medium which removes one of the materials of the mirror at a larger rate than it removes the other material of the mirror, thereby forming a grating in the side surface.

8. Method of claim 1, further comprising depositing at least one further layer of spacer material onto the etalon.

9. Method of claim 1, comprising forming a multiplicity of nonlinear Fabry-Perot etalons the substrate, with each etalon being optically isolated from the other etalons.

10. Method of claim 9, wherein the etalons are optically isolated by means comprising removal of deposited material surrounding the etalons such that substantially every etalon on the substrate is an isolated mesa-like element.

11. Method of claim 9, wherein the etalons are optically isolated by means comprising implanting ions into the deposited material such that the optical properties of the material surrounding the etalons are changed.

12. Method of claim 1, wherein the materials of the active mirror and the thickness of the layers of the active mirror are selected such that the reflectivity of the active mirror for radiation of frequency $\nu_o$ and intensity below a threshold value $I_t$ is less than the reflectivity of the active mirror for the radiation of frequency $\nu_o$ and intensity greater than $I_t$.

13. Method of claim 2, wherein the material of the at least one layer is substantially transparent at $\nu_o$, and has an etch rate in a given medium that is substantially smaller than the etch rate of the first material in the given medium.

14. Method of claim 13, further comprising removing substantially all of the supported structure in at least a portion of the substrate.

15. Method of claim 14, wherein substantially all of the support structure is removed, and further comprising removing substantially all of the material of the at least one layer, and bonding transparent support means to at least one of the first and second mirrors.

16. Method of claim 13, comprising forming a multiplicity of nonlinear Fabry-Perot etalons on the substrate, with each etalon being optically isolated from the other etalons.

17. Apparatus comprising at least one nonlinear Fabry-Perot etalon manufactured according to the method of claim 1, and further comprising a source of electromagnetic radiation of frequency $\nu_o$; means for causing the radiation of frequency $\nu_o$ to interact with the etalon whereby the optical state of the etalon can be changed from a first state to a second state; and means that are responsive to the optical state of the etalon.

18. Apparatus of claim 17, wherein the apparatus is an optical computer.

19. Apparatus of claim 17, wherein the apparatus is an optical data processing apparatus.

20. Apparatus of claim 17, wherein the apparatus is an optical communications apparatus.

21. Articles comprising at least one nonlinear Fabry-Perot etalon comprisng a first and a second mirror and a spacer between the first and second mirrors, the article comprising a substrate having a planar major surface and material deposited onto the major surface, at least some of the deposited material being optically nonlinear at an operating frequency $\nu_o$;
characterized in that the deposited material comprises
(a) the first mirror, deposited onto the major surface, the first mirror comprising alternating layers of at least two materials that differ in their refractive index at $\nu_o$;
(b) the spacer, deposited onto the first mirror;
(c) the second mirror, deposited onto the spacer, the second mirror also comprising alternating layers of at least two materials that differ in their refractive index at $\nu_o$; and wherein
(d) at least one of the first and second mirrors is an active mirror comprising semiconductor material that is optically nonlinear at $\nu_o$.

22. Article of claim 21, wherein the substrate is a compound substrate comprising a support structure consisting of a first material and having a planar major surface, and at least one further layer deposited onto the major surface of the support surface.

23. Article of claim 22, wherein the at least one further layer consists essentially of material whose etch rate in a given etching medium is substantially smaller than the etch rate of the first material, and wherein substantially all of the first material support structure has been removed in a portion of the substrate.

24. Article of claim 23, wherein the article comprises a multiplicity of optically isolated nonlinear Fabry-Perot etalons.

25. Articles of claim 21, wherein the article comprises a multiplicity of optically isolated nonlinear Fabry-Perot etalons.

26. Article of claim 21, wherein the spacer comprises multiple quantum wells.

* * * * *